United States Patent
Saquilon et al.

(10) Patent No.: US 10,805,483 B2
(45) Date of Patent: Oct. 13, 2020

(54) IMAGE PROCESSING APPARATUS WHICH PERFORMS AN IMAGE PROCESS BASED UPON ACQUIRED IMAGE DATA AND METHOD FOR CONTROLLING IMAGE PROCESSING APPARATUS

(71) Applicant: KYOCERA Document Solutions Inc., Osaka (JP)

(72) Inventors: Joard Saquilon, Osaka (JP); Shaneen Rose Galela, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/563,194

(22) Filed: Sep. 6, 2019

(65) Prior Publication Data

US 2020/0106894 A1  Apr. 2, 2020

(30) Foreign Application Priority Data

Oct. 1, 2018 (JP) ................................. 2018-186868

(51) Int. Cl.
- *H04N 1/00* (2006.01)
- *G06F 3/12* (2006.01)
- *H04N 1/23* (2006.01)

(52) U.S. Cl.
CPC ....... *H04N 1/00395* (2013.01); *G06F 3/1204* (2013.01); *G06F 3/1254* (2013.01); *H04N 1/00392* (2013.01); *H04N 1/2338* (2013.01)

(58) Field of Classification Search
None
See application file for complete search history.

(56) References Cited

U.S. PATENT DOCUMENTS

| | | | | |
|---|---|---|---|---|
| 5,499,108 A | * | 3/1996 | Cotte | H04N 1/00212 358/400 |
| 2008/0267534 A1 | * | 10/2008 | Madhvanath | G06K 9/00463 382/305 |
| 2009/0046327 A1 | * | 2/2009 | Sakai | H04N 1/00352 358/471 |
| 2009/0257098 A1 | * | 10/2009 | Madhvanath | H04N 1/00355 358/474 |
| 2010/0058180 A1 | * | 3/2010 | Hirayama | H04N 1/0044 715/274 |
| 2012/0147412 A1 | * | 6/2012 | Tsujimoto | H04N 1/00244 358/1.14 |
| 2013/0016390 A1 | * | 1/2013 | Hsi | H04N 1/0036 358/1.15 |
| 2015/0249756 A1 | * | 9/2015 | Motegi | G06F 3/1285 358/1.13 |

FOREIGN PATENT DOCUMENTS

JP 2009-105492 A 5/2009

\* cited by examiner

*Primary Examiner* — Thomas D Lee
(74) *Attorney, Agent, or Firm* — Stein IP, LLC

(57) ABSTRACT

An image processing apparatus includes an acquisition unit, a storage medium, and a controller. The controller determines whether or not acquired image data includes a first type image and a second type image. In a case where the acquired image data includes the first type image and the second type image, the controller performs an image process corresponding to the first type image with respect to the acquired image data and generates job execution image data. Based on the execution image data thus generated, the controller performs a job corresponding to the second type image.

8 Claims, 8 Drawing Sheets

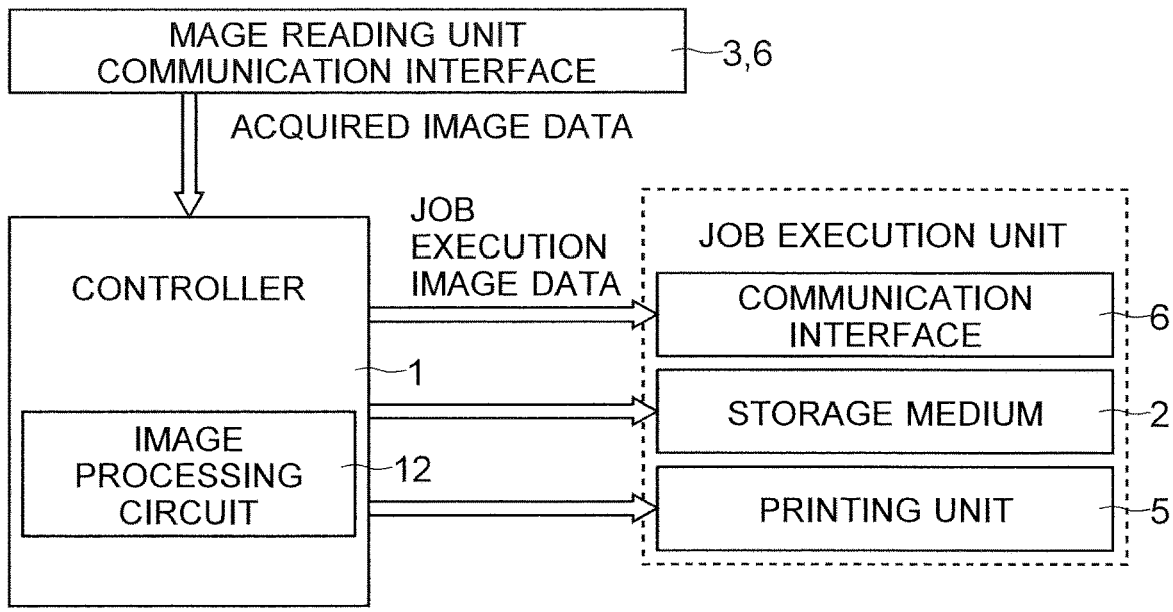

FIG.15
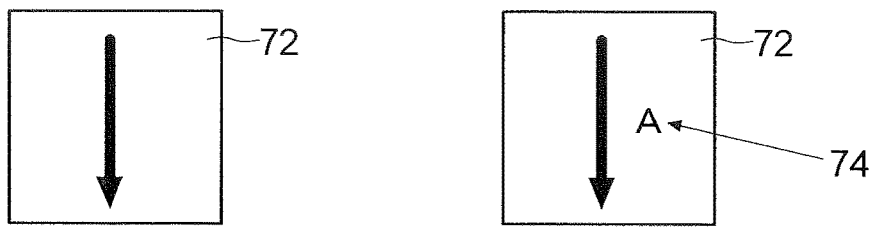
FIG.16
| Saving Destination Symbol | Address of Saving Location | |
|---|---|---|
| A | "C:¥dddd¥eeee¥ffff¥gggg¥hhhh" | D3 |
| B | "C:¥iiii¥jjjj¥kkkk¥llll¥mmmm" | |
| : | : | |
FIG.17
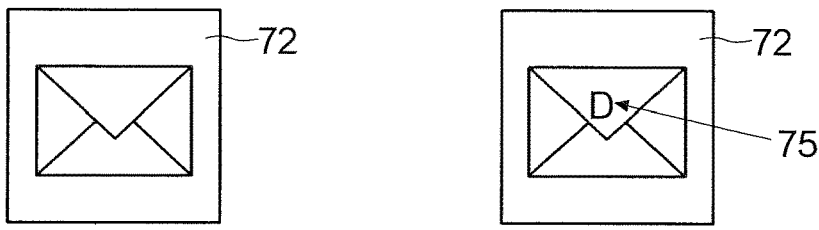
FIG.18
| Transmission Destination Symbol | Address of Transmission Destination | |
|---|---|---|
| D | "share:¥nnnn¥oooo¥pppp¥qqqq" | D4 |
| E | rrrr@ssss.tttt.com | |
| : | : | |
FIG.19
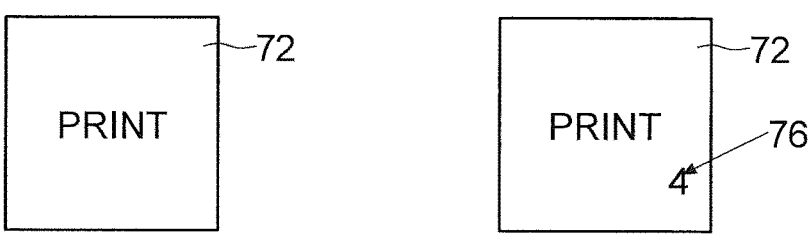

FIG.20
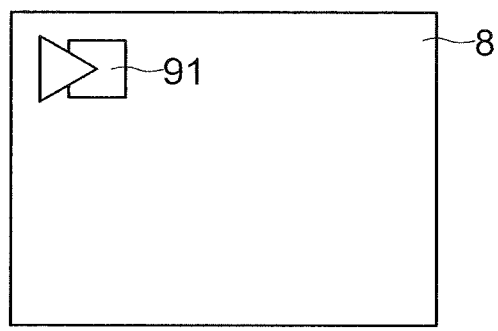
START MODE
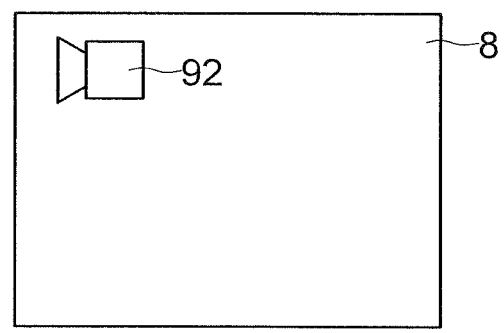
STOP MODE

IMAGE PROCESSING APPARATUS WHICH PERFORMS AN IMAGE PROCESS BASED UPON ACQUIRED IMAGE DATA AND METHOD FOR CONTROLLING IMAGE PROCESSING APPARATUS

INCORPORATION BY REFERENCE

This application is based upon and claims the benefit of priority from the corresponding Japanese Patent Application No. 2018-186868 (filed on Oct. 1, 2018), the contents of which are incorporated herein by reference.

BACKGROUND

The present disclosure relates to an image processing apparatus that executes a job based on image data.

Some image processing apparatuses process image data obtained through reading of an original document and execute a job. Printing is an example of a type of such a job. Examples of this type of image processing apparatus include a multi-functional peripheral, a printer, and a facsimile apparatus. A user may handwrite something on an original document. For example, a check mark or an underline is written on an original document. There is known an image processing apparatus that performs, with respect to image data of an original document, image processing for improving readability of a handwritten part thereof.

Specifically, there is known an image processing apparatus that reads an original document containing a handwritten character or graphic and performs processing of image data obtained through the reading. The image processing apparatus further determines, based on the image data, whether a hue of a handwritten region is the same as or similar to a hue of an outside region surrounding the handwritten region and performs, based on a result of the determination, with respect to the image data, an adjustment of a hue, a chroma, or lightness of an edge part of the handwritten region composed of the handwritten character or graphic or a prescribed area adjacent to the handwritten region.

An image processing apparatus of recent years has increased in functionality and thus has a multitude of types of image processing available. Operational settings of the image processing apparatus have become complex due to numerous sellable items and settings. It is required to select a type of image processing to be used from among the multitude of types of image processing available.

SUMMARY

An image processing apparatus according to the present disclosure includes an acquisition unit, a storage medium, and a controller. The acquisition unit acquires image data. The storage medium stores first definition data and second definition data. Based on the first definition data and the second definition data, the controller determines whether or not acquired image data acquired by the acquisition unit includes a first type image and a second type image. The first definition data is data defining data of the first type image and an image process corresponding to the first type image. The second definition data is data defining data of the second type image and a type of a job corresponding to the second type image. In a case where the first type image and the second type image are included in the acquired image data, the controller performs the image process corresponding to the first type image with respect to the acquired image data and generates job execution image data. Based on the job execution image data thus generated, the controller performs the job corresponding to the second type image.

A method for controlling an image processing apparatus according to the present disclosure includes storing first definition data and second definition data, based on the first definition data and the second definition data, determining whether or not acquired image data acquired includes a first type image and a second type image, wherein the first definition data is data defining data of the first type image and an image process corresponding to the first type image, wherein the second definition data is data defining data of the second type image and a type of a job corresponding to the second type image, in a case where the acquired image data includes the first type image and the second type image, performing the image process corresponding to the first type image with respect to the acquired image data and generating job execution image data, and based on the job execution image data thus generated, performing the job corresponding to the second type image.

Further features and advantages of the present disclosure will be made still more apparent from the description of an embodiment given below.

BRIEF DESCRIPTION OF THE DRAWINGS

FIG. 2 is a view showing one example of jobs executable in the multi-functional peripheral according to the embodiment.

FIG. 3 is a view showing one example of first definition data according to the embodiment.

FIG. 4 is a view showing one example of second definition data according to the embodiment.

FIG. 15 is a view showing one example of a second type image according to the embodiment.

FIG. 16 is a view showing one example of saving destination definition data according to the embodiment.

FIG. 17 is a view showing another example of the second type image according to the embodiment.

FIG. 18 is a view showing one example of transmission destination definition data according to the embodiment.

FIG. 19 is a view showing still another example of the second type image according to the embodiment.

FIG. 20 is a view for explaining a multi-functional peripheral according to a modification example.

DETAILED DESCRIPTION

The present disclosure is to enable an operation of an image processing apparatus to be easily commanded. The present disclosure reduces work and time required for a setting operation. With reference to FIG. 1 to FIG. 19, the following describes the present disclosure. The following description uses a multi-functional peripheral 100 as an example of the image processing apparatus. The image processing apparatus is not limited to the multi-functional peripheral 100. The image processing apparatus may be an image forming apparatus of any other type such as a printer. Elements such as configurations and arrangements described in an embodiment of the present disclosure do not limit the scope of the disclosure and are merely illustrative examples.

(Multi-Functional Peripheral 100)

Figure 1:
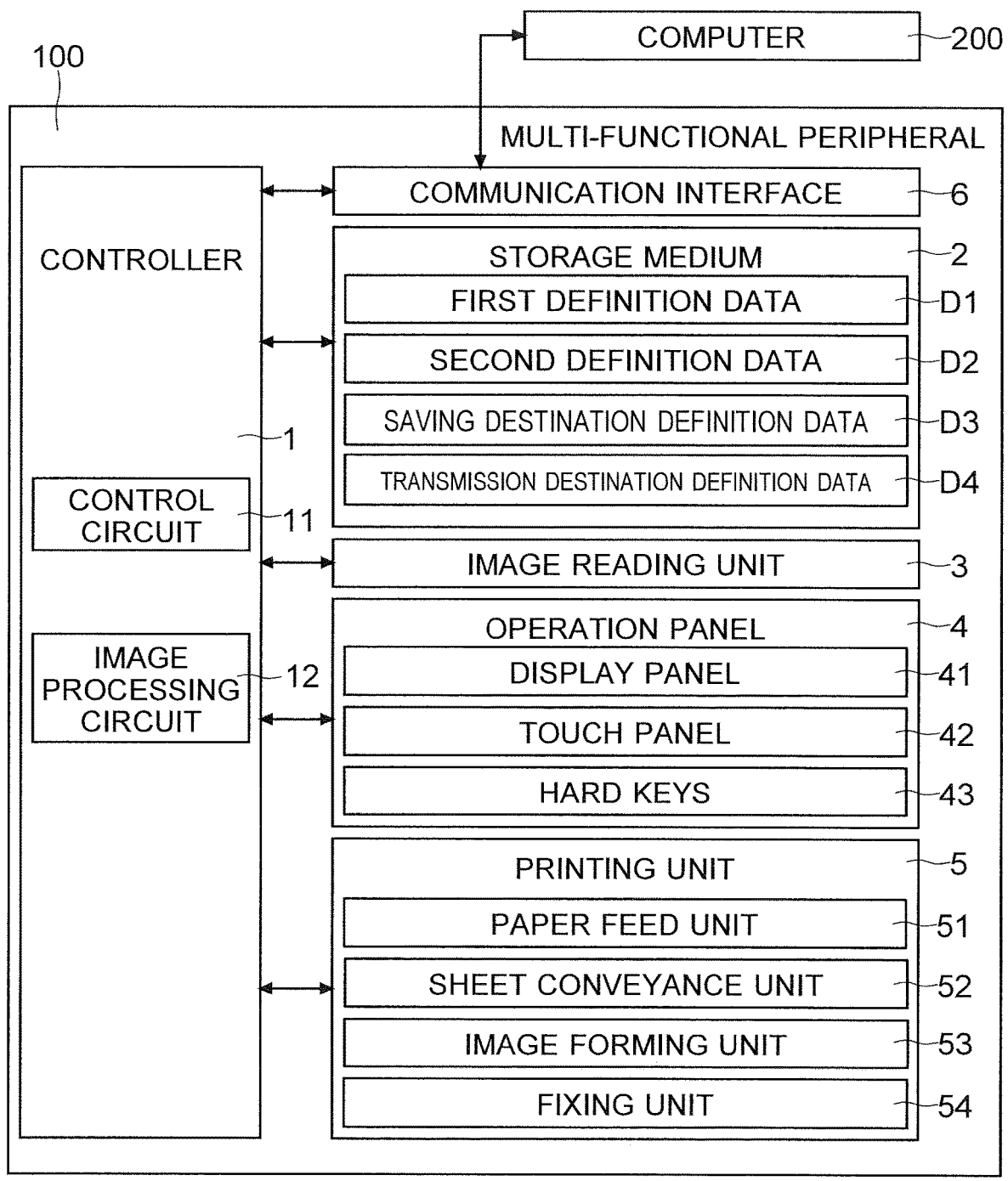
FIG. 1 is a view showing one example of a multi-functional peripheral according to an embodiment.

With reference to FIG. 1, a description is given of one example of the multi-functional peripheral 100 according to the embodiment. The multi-functional peripheral 100 includes a controller 1 (a processor), a storage medium 2, an image reading unit 3 (corresponding to an acquisition unit), an operation panel 4, a printing unit 5, and a communication interface 6 (corresponding to the acquisition unit).

The controller 1 (control board) controls an operation of the multi-functional peripheral 100. The controller 1 includes a control circuit 11 and an image processing circuit 12. The control circuit 11 is, for example, a CPU. Based on a program or data stored in the storage medium 2, the control circuit 11 controls various units (the image reading unit 3, the operation panel 4, the printing unit 5, and the communication interface 6). The image processing circuit 12 performs various types of image processing. For example, the image processing circuit 12 is a circuit (an ASIC) dedicated to image processing.

The multi-functional peripheral 100 includes, as the storage medium 2, a ROM, an HDD, and a RAM. The ROM is, for example, a flash ROM. The recording medium 2 includes a large-capacity non-volatile storage device such as an HDD or an SSD. The storage medium 2 stores various types of data and control programs. For example, the storage medium 2 stores control data, setting data, and image data.

The image reading unit (image reader, scanner) 3 includes an original document table (a contact glass) for placing an original document thereon. In reading an original document, the controller 1 controls the image reading unit 3 to read the original document placed on the original document table. In order to read an original document, the image reading unit 3 includes a light source (a lamp), a lens, and an image sensor (a line sensor). Further, based on reading by the image sensor, the image reading unit 3 generates image data. Image data of an original document can be acquired by using the image reading unit 3. The image reading unit 3 functions as the acquisition unit that acquires image data. In the following description, image data acquired based on reading by the image reading unit 3 is referred to as acquired image data 8.

The operation panel 4 includes a display panel 41, a touch panel 42, and a hard keys 43. The display panel 41 displays a screen and an image. The controller 1 controls display by the display panel 41. The controller 1 controls the display panel 41 to display an operation image used for setting of a job. Examples of such an operation image include a button, a key, and a tab. The touch panel 42 accepts an operation performed by a user. The touch panel 42 is provided on an upper surface of the display panel 41. The touch panel 42 recognizes a touched position. Based on an output of the touch panel 42, the controller 1 recognizes an operation image operated. Based on the operated operation image, the controller 1 recognizes contents of an operation performed by a user. The hard keys 43 also accept an operation performed by a user.

The printing unit 5 includes a paper feed unit 51, a sheet conveyance unit 52, an image forming unit 53, and a fixing unit 54. Sheets are placed in the paper feed unit 51. In a printing job, the controller 1 controls the paper feed unit 51 to feed a sheet. The controller 1 controls the sheet conveyance unit 52 to convey the sheet. The controller 1 controls the image forming unit 53 to form a toner image based on raster data. The controller 1 controls the image forming unit 53 to transfer the toner image onto the sheet being conveyed. The controller 1 controls the fixing unit 54 to fix the toner image thus transferred onto the sheet. The controller 1 controls the sheet conveyance unit 52 to discharge the sheet thus subjected to the fixing toward outside the apparatus.

The controller 1 is communicable with a computer 200 via a network. The communication interface 6 communicates with the computer 200. The communication interface 6 includes a connector, a communication circuit, a communication memory, and communication software. The communication interface 6 can acquire image data from the computer 200. The communication interface 6 also functions as the acquisition unit that acquires image data. In the following description, image data acquired by the communication interface 6 is also referred to as the acquired image data 8.

(Jobs Executable in Multi-Functional Peripheral 100)

Next, with reference to FIG. 2, a description is given of one example of types of jobs executable in the multi-functional peripheral 100 of the embodiment. A plurality of types of jobs are executable in the multi-functional peripheral 100. For example, in the multi-functional peripheral 100, based on image data (the acquired image data 8) acquired by the image reading unit 3 or the communication interface 6, a saving job, a transmission job, and a print job can be performed.

In executing a job based on the acquired image data 8, the controller 1 (the image processing circuit 12) performs image processing of the acquired image data 8. The controller 1 performs the image processing and generates job execution image data. The controller 1 performs control so that the job is executed based on the job execution image data thus generated.

For example, in a saving job, the controller 1 performs image processing of the acquired image data 8. Based on the acquired image data 8 thus subjected to the image processing, the controller 1 generates job execution image data to be saved. The controller 1 generates, as the job execution image data, data in a format of a predetermined saving file. The controller 1 performs control so that the saving file (the job execution image data) thus generated is stored in the storage medium 2 in a non-volatile manner. In the saving job, the storage medium 2 functions as a job execution unit.

Furthermore, also in a transmission job, the controller 1 (the image processing circuit 12) performs image processing of the acquired image data 8. Based on the acquired image data 8 thus subjected to the image processing, the controller 1 generates job execution image data to be transmitted. The controller 1 generates, as the job execution image data, data in a format of a predetermined transmission file. The controller 1 controls the communication interface 6 to transmit the transmission file (the job execution image data) thus generated. In the transmission job, the communication interface 6 functions as the job execution unit.

Furthermore, also in a print job, the controller 1 (the image processing circuit 12) performs image processing of the acquired image data 8. Based on the acquired image data 8 thus subjected to the image processing, the controller 1 generates job execution image data. The controller 1 generates, as the job execution image data, image data usable for printing performed by the image forming unit 53. For example, the controller 1 generates, as the job execution image data, image data subjected to a halftone dot process (a halftone process). The controller 1 controls the printing unit 5 to perform printing based on the job execution image data thus generated. In the print job, the printing unit 5 functions as the job execution unit.

(Process in Mark Using Mode)

Figure 5:
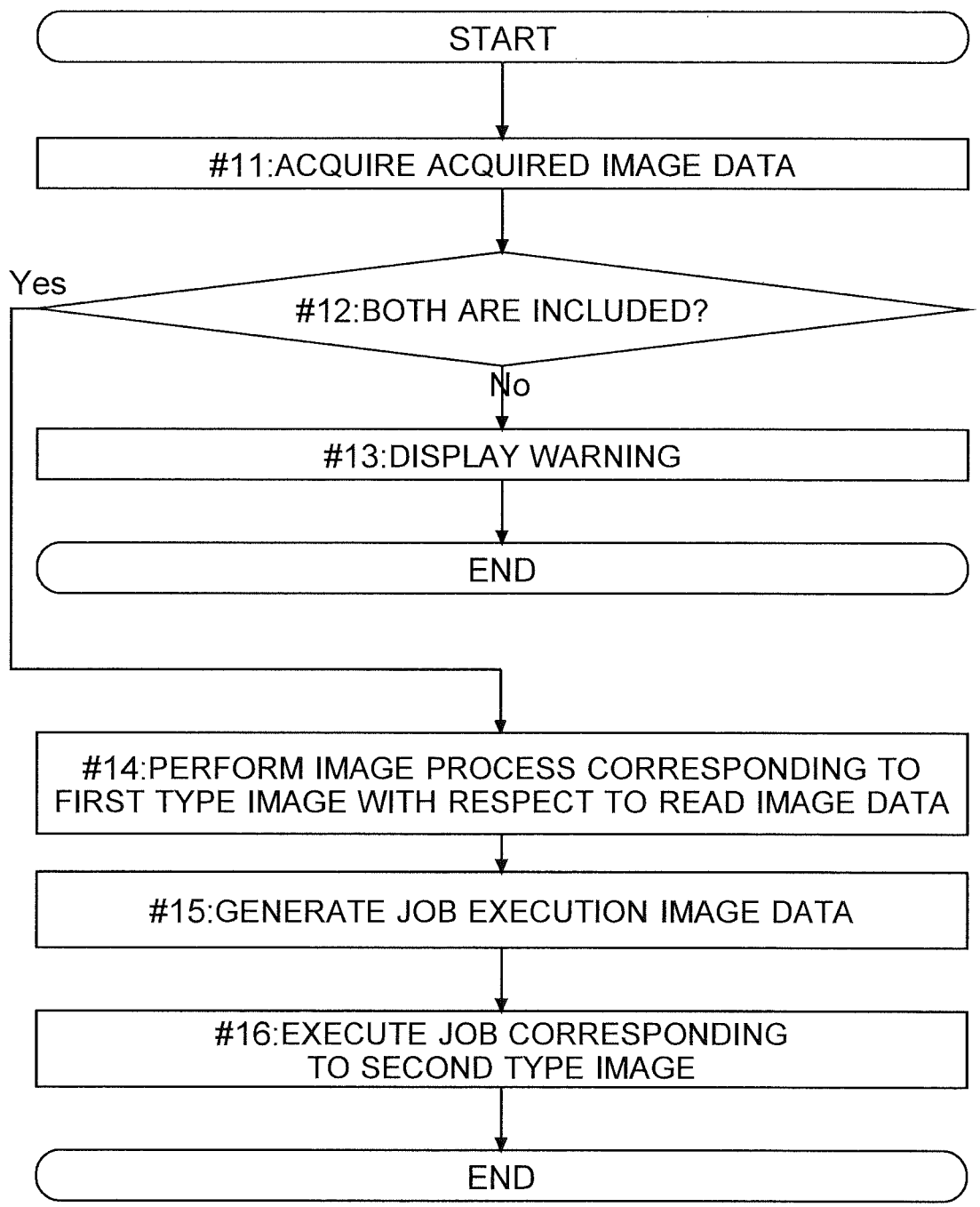
FIG. 5 is a view showing one example of a process in a mark using mode performed in the multi-functional peripheral according to the embodiment.

Next, with reference to FIG. 3 to FIG. 5, a description is given of one example of a process in a mark using mode performed in the multi-functional peripheral 100 according to the embodiment. In the multi-functional peripheral 100, the mark using mode is available. The operation panel 4 accepts a selection as to whether or not to use the mark using mode. Upon a selection being made to use the mark using mode on the operation panel 4, the controller 1 performs the process in the mark using mode.

The mark using mode is a mode in which a job is performed based on a first type image 71 and a second type image 72 included in the acquired image data 8. In using the mark using mode, the controller 1 analyzes the acquired image data 8. Further, the controller 1 determines whether or not the first type image 71 and the second type image 72 are included in the acquired image data 8. The controller 1 performs, with respect to the acquired image data 8, an image process corresponding to the first type image 71 and generates job execution image data. Furthermore, the controller 1 controls the job execution unit to perform, based on the job execution image data thus generated, a job corresponding to the second type image 72.

Upon a selection being made not to use the mark using mode on the operation panel 4, the controller 1 performs processing in a normal mode. In the normal mode, the controller 1 does not determine whether or not the first type image 71 and the second type image 72 are included in the acquired image data 8. Based on a setting made on the operation panel 4, the controller 1 (the image processing circuit 12) performs image processing. Furthermore, the controller 1 controls the job execution unit to perform a job of a type selected on the operation panel 4.

Here, the storage medium 2 stores first definition data D1 and second definition data D2. The first definition data D1 is data defining data of the first type image 71 and an image process corresponding to the first type image 71. FIG. 3 shows one example of the first definition data D1. As shown in FIG. 3, in the first definition data D1, types of image processing available in the multi-functional peripheral 100 are defined. A plurality of images are defined as the first type image 71. There are defined pieces of image data of the first type image 71 corresponding to the types of image processing, respectively. FIG. 3 shows one example of a piece of first definition data D1 defining one of the plurality of images as the first type image 71 corresponding to an image process of re-sizing (size adjustment). The other images as the first type image 71 will be described later.

The second definition data D2 is data defining data of the second type image 72 and a type of a job corresponding to the second type image 72. FIG. 4 shows one example of the second definition data D2. As shown in FIG. 4, in the second definition data D2, types of jobs to be executed are defined. Furthermore, there are defined pieces of image data of the second type image 72 corresponding to the jobs, respectively. FIG. 4 shows one example of a piece of second definition data D2 defining an image as the second type image 72 corresponding to a transmission job. The other images as the second type image 72 will be described later.

Next, with reference to FIG. 5, a description is given of one example of a flow of the process in the mark using mode. In FIG. 5, "START" refers to a point in time when a job is started in the mark using mode. On the operation panel 4, a selection has been made to use the mark using mode.

When using the mark using mode, a user makes a setting so that the first type image 71 and the second type image 72 are included in the acquired image data 8. In performing a job involving reading of an original document, a user may affix a seal of the first type image 71 and a seal of the second type image 72 to an original document. In order that such seals can be easily created, the operation panel 4 may accept an instruction to print an image as the first type image 71 defined in the first definition data D1 and an image as the second type image 72 defined in the second definition data D2. In this case, the controller 1 controls the printing unit 5 to print only the image as the first type image 71 and the image as the second type image 72. The first type image 71 and the second type image 72, therefore, can be easily included in an original document. Moreover, the operation panel 4 may accept selections of an image as the first type image 71 to be printed and an image as the second type image 72 to be printed. Thus, only a frequently used type of image or a specific type of image can be printed on a seal sheet.

Furthermore, a user may add the first type image 71 and the second type image 72 by handwriting to an original document. Moreover, a user may prepare stamps (seal stamps) of the first type image 71 and the second type image 72. The first type image 71 and the second type image 72, therefore, can be included in an original document simply by putting the stamps on the original document.

In a case of transmitting image data from the computer 200, a user makes a setting so that the first type image 71 and the second type image 72 are included in image data before being transmitted. For example, software for editing and processing image data is installed in the computer 200. By using this software, a user adds the first type image 71 and the second type image 72 to image data to be transmitted for performing a job. By using a device (for example, a mouse) for operating the computer 200, the first type image 71 and the second type image 72 can be added to image data. In order to facilitate this addition, the computer 200 may store image data of the first type image 71 and image data of the second type image 72. In this case, a user can add the first type image 71 and the second type image 72 to image data by copying and pasting of the image data of the first type image 71 and the image data of the second type image 72 thus stored.

First, the controller 1 acquires the acquired image data 8 (step #11). In reading an original document, the controller 1 controls the image reading unit 3 to read the original document placed. The image reading unit 3 generates image data (the acquired image data 8) of the original document. Furthermore, the communication interface 6 may acquire the acquired image data 8 from the computer 200. Next, the controller 1 analyzes the acquired image data 8 and determines whether or not both of the first type image 71 and the second type image 72 are included therein (step #12).

The controller 1 (the control circuit 11 or the image processing circuit 12) may perform a pattern matching process so as to determine whether or not the acquired image data 8 includes the first type image 71. The controller 1 performs the pattern matching process for each image as the first type image 71 included in the first definition data D1. When the acquired image data 8 includes a part whose matching rate with (similarity rate to) image data of the first type image 71 is equal to or more than a predetermined threshold value, the controller 1 determines that the acquired image data 8 includes the first type image 71. Upon determining that the acquired image data 8 includes the first type image 71, the controller 1 identifies, as the first type image 71 included in the acquired image data 8, an image as the first type image 71 whose matching rate (similarity rate) is highest.

Furthermore, the controller 1 (the control circuit 11 or the image processing circuit 12) may perform the pattern matching process so as to determine whether or not the acquired image data 8 includes the second type image 72. The controller 1 performs the pattern matching process for each piece of image data of the second type image 72 included in the second definition data D2. When the acquired image data 8 includes a part whose matching rate with (similarity rate to) the image data of the second type image 72 is equal to or more than a predetermined threshold value, the controller 1 determines that the acquired image data 8 includes the second type image 72. Upon determining that the acquired image data 8 includes the second type image data 72, the controller 1 identifies, as the second type image 72 included in the acquired image data 8, an image as the second type image 72 whose matching rate (similarity rate) is highest.

In order to facilitate determination as to whether or not the first type image 71 and the second type image 72 are included, colors used in the first type image 71 and the second type image 72, respectively, may be predetermined. The color used in the first image 71 and the color used in the second type image 72 may be the same or different from each other. For example, a red color may be used in the first type image 71 and a blue color may be used in the second type image 72.

In this case, the operation panel 4 may accept selections of the color used in the first type image 71 and the color used in the second type image 72 from among a plurality of colors. The respective colors can be selected from among the plurality of colors. A range of pixel values corresponding to the colors thus selected is predetermined. In this case, the controller 1 (the image processing circuit 12) recognizes, among pixels contained in the acquired image data 8, pixels corresponding to the selected colors, respectively. The controller 1 performs pattern matching with graphics drawn by the pixels corresponding to the selected colors, respectively.

Upon determining that either or both of the first type image 71 and the second type image 72 is/are not included (No at step #12), the controller 1 controls the display panel 41 to display a warning (step #13). The warning is a message notifying that there are not enough numbers of type images and that the original document should be re-read. Then, this flow is ended (END). When the flow is ended via No at step #12, a job based on the read original document is not executed. The controller 1 does not generate job execution image data.

Upon determining that both of the first type image 71 and the second type image 72 are included (Yes at step #12), the controller 1 (the image processing circuit 12) performs an image process corresponding to the first type image 71 with respect to the acquired image data 8 (step #14). Here, the first type image 71 and the second type image 72 added to the original document or image data are unwanted in a resulting output. To this end, in performing the image process with respect to the acquired image data 8, the controller 1 may erase respective regions of the first type image 71 and the second type image 72. For example, the controller 1 may replace the first type image 71 and the second type image 72 with a white color. In a case of preventing information such as a character or a graphic from being erased, a user could add the first type image 71 and the second type image 72 to a margin of a page (a white part on the original document or image data).

Subsequently, the controller 1 generates job execution image data (step #15). Further, the controller 1 controls the job execution unit to perform, based on the job execution image data thus generated, a job corresponding to the second type image 72 (step #16). For example, in a case where an image as the second type image 72 corresponding to a print job is included in the acquired image data 8, the controller 1 performs control so that the print job is performed. Then, this flow is ended (END).

(First Type Image 71)

Next, with reference to FIG. 6 to FIG. 14, a description is given of one example of the first type image 71 according to the embodiment. There are a multitude of types of image processing available in the multi-functional peripheral 100. The following describes some of the multitude of types of image processing and images as the first type image 71 corresponding thereto. The following describes, as an example, a case where the first type image 71 is a representation (mark) including a frame of a rectangular (square) shape. Contents within the rectangular shape vary depending on a type of image processing. The frame may be omitted.

Some image processes are performed with respect to a designated partial area in the acquired image data 8. When using such an image process, a user encloses, in an original document or image data, an area desired to be subjected to the image process with a designating frame (a designation frame 80). A frame line of the designation frame 80 does not have to be in a rectangular shape. The frame line of the designation frame 80 may include a curve. The designation frame 80 may be handwritten on an original document. The controller 1 recognizes the designation frame 80 included in the acquired image data 8. The first type image 71 and the second type image 72 are arranged so as to be in contact with the designation frame 80. The controller 1 recognizes, as the designation frame 80, a line being in contact with the first type image 71 and enclosing a region.

In order to facilitate recognition of the designation frame 80, a color used for the frame line of the designation frame 80 may be predetermined. The operation panel 4 may accept a selection of the color to be used for the frame line of the designation frame 80 from among a plurality of colors. A range of pixel values corresponding to selectable colors is predetermined. In this case, the controller 1 (the image processing circuit 12) recognizes, among pixels contained in the acquired image data 8, a pixel corresponding to the color selected. The controller 1 recognizes, as the area to be subjected to the image process, a region enclosed by a line constituted of the pixel corresponding to the selected color.

(1) Re-Sizing (Size Adjustment)

Figure 6:
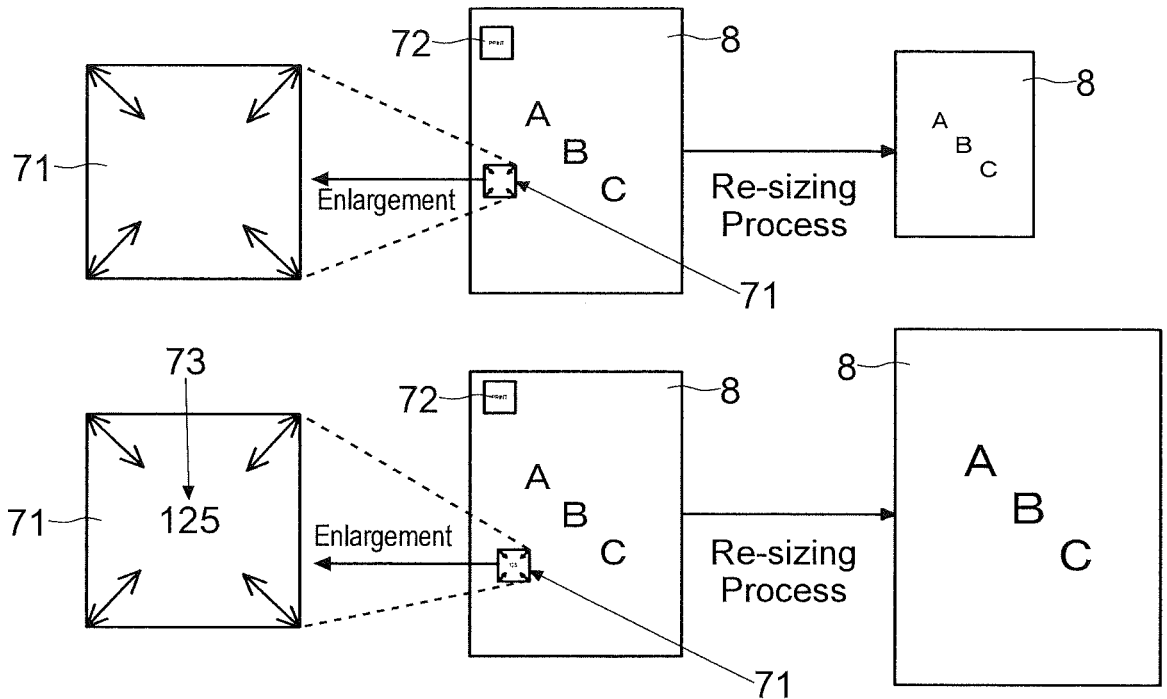
FIG. 6 is a view showing one example of a first type image according to the embodiment.

Each of graphics at the left end in FIG. 6 is an enlarged representation of an image as the first type image 71 corresponding to an image process of re-sizing. The image process of re-sizing is a process of enlarging or reducing a size of the acquired image data 8 as a whole. Each of drawings in the middle in FIG. 6 shows one example of the acquired image data 8 to which the image as the first type image 71 corresponding to re-sizing has been added. When wishing to perform the image process of re-sizing, a user adds the image as the first type image 71 corresponding to re-sizing to an original document or image data. The image as the first type image 71 corresponding to re-sizing includes four double-headed arrows. One ends of the double-headed arrows are in contact with corners of the rectangular shape.

Each of drawings at the right end in FIG. 6 shows one example of image data that has been subjected to the image process of re-sizing. A user can make a setting so that a processing numerical value 73 is included in (added to) the image as the first type image 71 corresponding to re-sizing. The processing numerical value 73 used for re-sizing is a scaling factor. The controller 1 performs an OCR process with respect to contents within a region of the image as the first type image 71 corresponding to re-sizing. Then, it is determined whether or not the processing numerical value 73 (a scaling factor, %) is included therein.

When the image as the first type image 71 corresponding to re-sizing includes the processing numerical value 73, the controller 1 (the image processing circuit 12) performs an image process of changing the size of the acquired image data 8 to a size obtained by multiplying the size of the acquired image data 8 by the processing numerical value 73. When "125" is written in the image as the first type image 71 corresponding to re-sizing as shown in the drawing on the lower left side in FIG. 6, the controller 1 generates image data obtained by enlarging the acquired image data 8 to 125%. In a case where a scaling factor less than 100% is written, the controller 1 generates image data obtained by reducing the acquired image data 8.

When the image as the first type image 71 corresponding to re-sizing does not include the processing numerical value 73, the controller 1 (the image processing circuit 12) performs an image process of changing the size of the acquired image data 8 to a size obtained by multiplying the size of the acquired image data 8 by a default scaling factor. When no numerical value indicating a scaling factor is written in the image as the first type image 71 as shown in the drawing on the upper left side in FIG. 6, the controller 1 generates job execution image data obtained by reducing the acquired image data 8 (in an example shown in FIG. 6, the default scaling factor is 65%). The default scaling factor used for the re-sizing process is predetermined. The operation panel 4 may accept a setting of the default scaling factor. In this case, the controller 1 performs the image process of re-sizing by using a scaling factor thus set as the default scaling factor.

(2) Deletion (Erasure)

Figure 7:
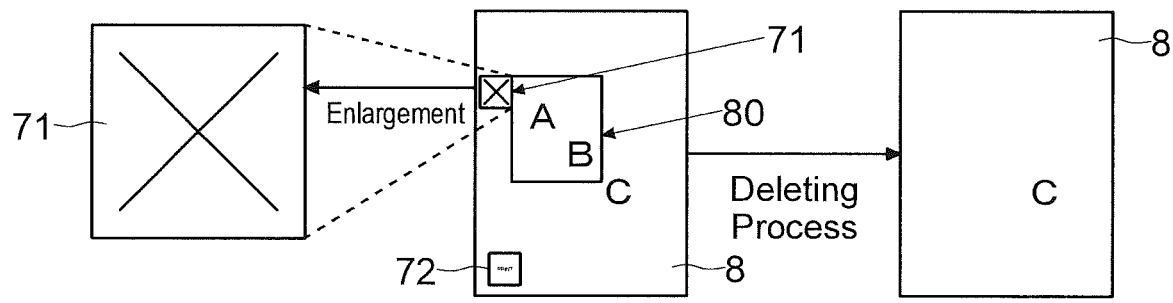
FIG. 7 is a view showing another example of the first type image according to the embodiment.

A graphic at the left end in FIG. 7 is an enlarged representation of an image as the first type image 71 corresponding to an image process of deletion. The image process of deletion is a process of erasing (replacing with white pixels) contents within an area in the acquired image data 8 designated by the designation frame 80. When wishing to perform the image process of deletion, a user encloses, with the designation frame 80, an area in an original document or image data desired to be erased. The user adds the image as the first type image 71 corresponding to deletion to the original document so that the image is in contact with the designation frame 80. The image as the first type image 71 corresponding to deletion includes a mark "x."

A drawing in the middle in FIG. 7 shows one example of the acquired image data 8 to which the image as the first type image 71 corresponding to deletion and the designation frame 80 have been added. A drawing at the right end in FIG. 7 shows one example of image data that has been subjected to the image process of deletion (the acquired image data 8 that has been processed). The controller 1 (the image processing circuit 12) performs an image process of deleting contents within the designated area (the designation frame 80). Based on the acquired image data 8 that has been processed, the controller 1 generates job execution image data.

(3) Cropping

Figure 8:
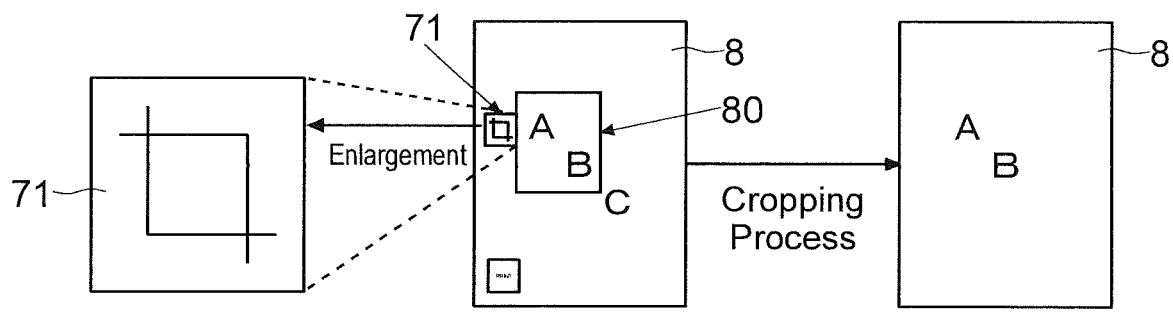
FIG. 8 is a view showing still another example of the first type image according to the embodiment.

A graphic at the left end in FIG. 8 is an enlarged representation of an image as the first type image 7 corresponding to an image process of cropping (trimming). The image process of cropping is a process of retaining only an area in the acquired image data 8 designated by the designation frame 80 (replacing pixels outside this area with white pixels). When wishing to perform the image process of cropping, a user encloses, with the designation frame 80, an area in an original document or image data desired to be retained. The user adds the image as the first type image 71 corresponding to cropping so that the image is in contact with the designation frame 80. The image as the first type image 71 corresponding to cropping includes a symbol in the shape of an L overlapping with an inverted L.

A drawing in the middle in FIG. 8 shows one example of the acquired image data 8 to which the image as the first type image 71 corresponding to cropping and the designation frame 80 have been added. A drawing at the right end in FIG. 8 shows one example of image data that has been subjected to the image process of cropping (the acquired image data 8 that has been processed). The controller 1 (the image processing circuit 12) performs, with respect to the acquired image data 8, an image process of erasing contents outside the designated area (the designation frame 80). Based on the acquired image data 8 that has been processed, the controller 1 generates job execution image data.

(4) Rotation

Figure 9:
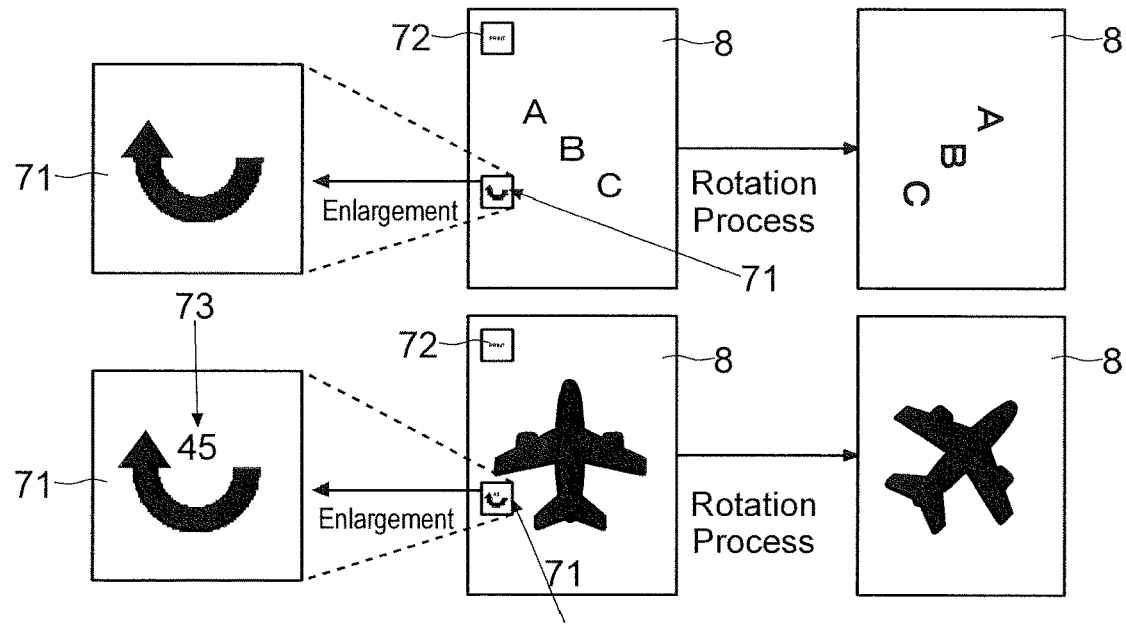
FIG. 9 is a view showing yet another example of the first type image according to the embodiment.

Each of graphics at the left end in FIG. 9 is an enlarged representation of an image as the first type image 71 corresponding to an image process of rotation. The image process of rotation is a process of rotating the acquired image data 8. When wishing to perform the image process of rotation, a user adds the image as the first type image 71 corresponding to rotation to an original document or image data. Each of drawings in the middle in FIG. 9 shows one example of the acquired image data 8 to which the image as the first type image 71 corresponding to rotation has been added. The image as the first type image 71 corresponding to rotation includes a semicircular arc with an arrow. A rotation direction can be selected by a position of the arrow on the semicircular arc. When the arrow is provided to indicate rotation in a clockwise direction, the controller 1 performs control so that the acquired image data 8 is rotated in the clockwise direction. When the arrow is provided to indicate rotation in a counterclockwise direction, the controller 1 performs control so that the acquired image data 8 is rotated in the counterclockwise direction.

Each of drawings at the right end in FIG. 9 shows one example of image data that has been subjected to the image process of rotation (the acquired image data 8 that has been processed). A user can make a setting so that the processing numerical value 73 is included in (added to) the image as the first type image 71 corresponding to rotation. The processing numerical value 73 used for rotation is an angle. The controller 1 performs an OCR process with respect to contents within a region of the image as the first type image 71 corresponding to rotation. Then, the controller 1 determines whether or not the image as the first type image 71 includes the processing numerical value 73 (an angle).

When the image as the first type image 71 corresponding to rotation includes the processing numerical value 73, the controller 1 (the image processing circuit 12) performs control so that the acquired image data 8 is rotated by an angle indicated by a numerical value added. For example, when an angle value of "45" degrees is written in the image as the first type image 71 as shown in the drawing on the lower left side in FIG. 9, the controller 1 generates image data obtained by rotating the acquired image data 8 clockwise by 45 degrees.

When the image as the first type image 71 corresponding to rotation does not include the processing numerical value 73, the controller 1 (the image processing circuit 12) performs control so that the acquired image data 8 is rotated by a default angle. When no numerical value indicating an angle is written in the image as the first type image 71 as shown in the drawing on the upper left side in FIG. 9, the controller 1 generates image data obtained by rotating the acquired image data 8 clockwise by 90 degrees. The default rotation angle is predetermined. The operation panel 4 may accept a setting of the default rotation angle. In this case, the controller 1 performs the image process of rotation by using an angle thus set as the default rotation angle.

(5) Flipping

Figure 10:
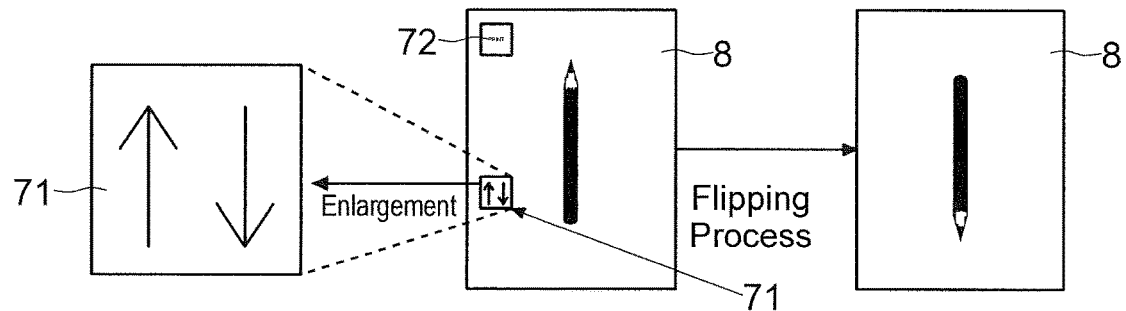
FIG. 10 is a view showing yet another example of the first type image according to the embodiment.

A graphic at the left end in FIG. 10 is an enlarged representation of an image as the first type image 71 corresponding to an image process of flipping (vertical flipping). The image process of flipping is a process of vertically flipping the acquired image data 8 as a whole. When wishing to perform the image process of flipping, a user adds the image as the first type image 71 corresponding to flipping to an original document or image data. The image as the first type image 71 corresponding to flipping includes an upward arrow and a downward arrow. The upward arrow and the downward arrow are arranged side by side in a left-right direction.

A drawing in the middle in FIG. 10 shows one example of the acquired image data 8 to which the image as the first type image 71 corresponding to flipping has been added. A drawing at the right end in FIG. 10 shows one example of image data that has been subjected to the image process of flipping (the acquired image data 8 that has been processed). Based on the acquired image data 8 that has been processed, the controller 1 generates job execution image data.

(6) Mirroring

Figure 11:
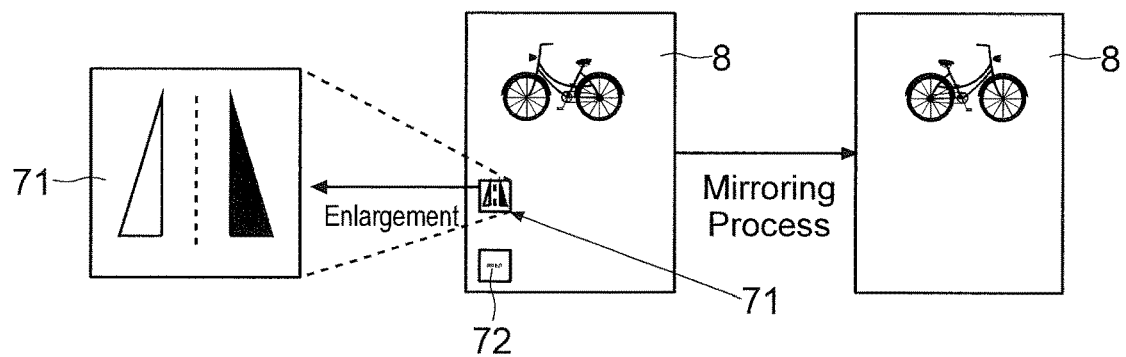
FIG. 11 is a view showing yet another example of the first type image according to the embodiment.

A graphic at the left end in FIG. 11 is an enlarged representation of an image as the first type image 71 corresponding to an image process of mirroring (horizontal flipping). The image process of mirroring is a process of horizontally flipping the acquired image data 8 as a whole. When wishing to perform the image process of mirroring, a user adds the image as the first type image 71 corresponding to mirroring to an original document. The image as the first type image 71 corresponding to mirroring includes a hollow triangle and a solid triangle. These triangles are line-symmetrical to each other with respect to a broken line. By being symmetrical to each other, the triangles indicate a mirroring process.

A drawing in the middle in FIG. 11 shows one example of the acquired image data 8 to which the image as the first type image 71 corresponding to mirroring has been added. A drawing at the right end in FIG. 11 shows one example of image data that has been subjected to the image process of mirroring (the acquired image data 8 that has been processed). Based on the acquired image data 8 that has been processed, the controller 1 generates job execution image data.

(7) Partial Enlargement

Figure 12:
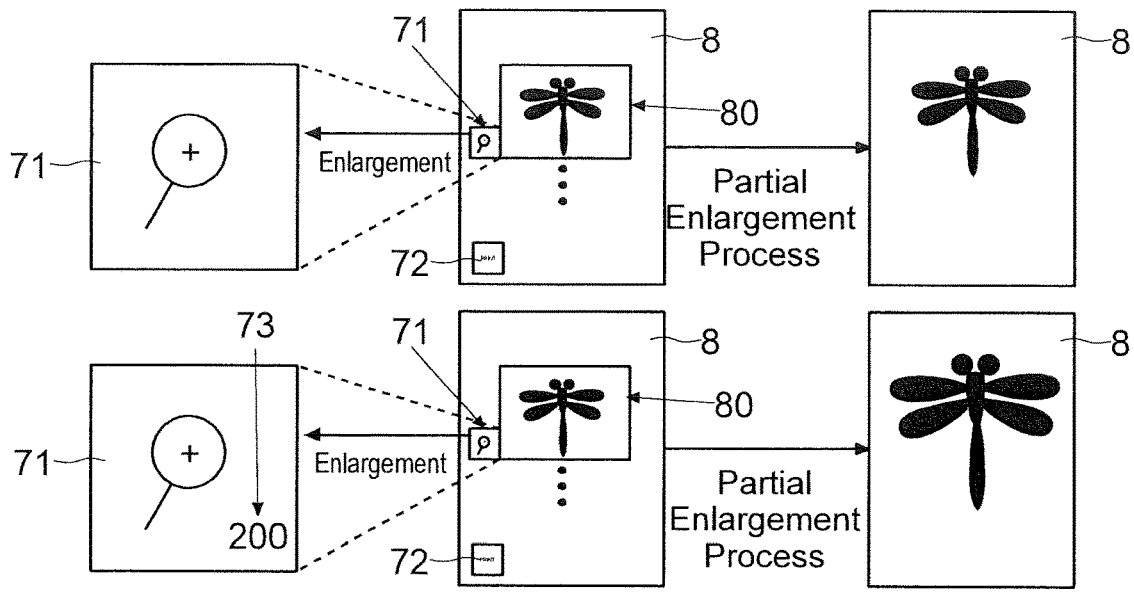
FIG. 12 is a view showing yet another example of the first type image according to the embodiment.

Each of graphics at the left end in FIG. 12 is an enlarged representation of an image as the first type image 71 corresponding to an image process of partial enlargement. The image process of partial enlargement is a process of enlarging an area in the acquired image data 8 designated by the designation frame 80. Furthermore, in the image process of partial enlargement, the controller 1 may erase contents outside the area designated by the designation frame 80 (may replace the contents with white pixels).

When wishing to perform the image process of partial enlargement, a user encloses, with the designation frame 80, an area in an original document or image data desired to be enlarged (desired to be retained). The user adds the image as the first type image 71 corresponding to partial enlargement to the original document. The image as the first type image 71 corresponding to partial enlargement includes an image of a magnifier including a symbol "+."

Each of drawings in the middle in FIG. 12 shows one example of the acquired image data 8 to which the image as the first type image 71 corresponding to partial enlargement and the designation frame 80 have been added. Each of drawings at the right end in FIG. 12 shows one example of image data that has been subjected to the image process of partial enlargement (the acquired image data 8 that has been processed). Based on the acquired image data 8 that has been processed, the controller 1 generates job execution image data.

The processing numerical value 73 can be included in (added to) the image as the first type image 71 corresponding to partial enlargement. The processing numerical value 73 used for partial enlargement is a scaling factor. The controller 1 performs an OCR process with respect to contents within a region of the image as the first type image 71 corresponding to partial enlargement. Then, it is determined whether or not the processing numerical value 73 (a scaling factor, %) is included therein.

When the image as the first type image 71 corresponding to partial enlargement includes the processing numerical value 73, the controller 1 (the image processing circuit 12) performs an image process of enlarging a size of image data within the designation frame 80 to a size obtained by multiplying the size of the image data by the processing numerical value 73. When "200%" is written as a scaling factor in the image as the first type image 71 corresponding to partial enlargement as shown in the drawing on the lower left side in FIG. 12, the controller 1 generates image data to which data obtained by enlarging, to double, sizes (vertical and horizontal sizes) of the area enclosed with the designation frame 80 has been pasted. The controller 1 pastes the data so that a center of the area enclosed with the designation frame 80 is aligned with a center of the data enlarged. Based on the image data thus generated, the controller 1 generates job execution image data.

When the image as the first type image 71 corresponding to partial enlargement does not include the processing numerical value 73, the controller 1 (the image processing circuit 12) performs an image process of increasing a size of image data within the designation frame 80 by a default scaling factor for partial enlargement. When no numerical value indicating a scaling factor is written in the image as the first type image 71 as shown in the drawing on the upper left side in FIG. 12, the controller 1 generates image data to which data obtained by increasing a size of the area enclosed with the designation frame 80 by the default scaling factor has been pasted. The controller 1 pastes the data so that a center of the area enclosed with the designation frame 80 is aligned with a center of the data enlarged. Based on the image data thus generated, the controller 1 generates job execution image data. The default scaling factor for a partial enlargement process is predetermined. The operation panel 4 may accept a setting of the default scaling factor for partial enlargement. In this case, the controller 1 performs the process by using a scaling factor thus set as the default scaling factor.

(8) Partial Reduction

Figure 13:
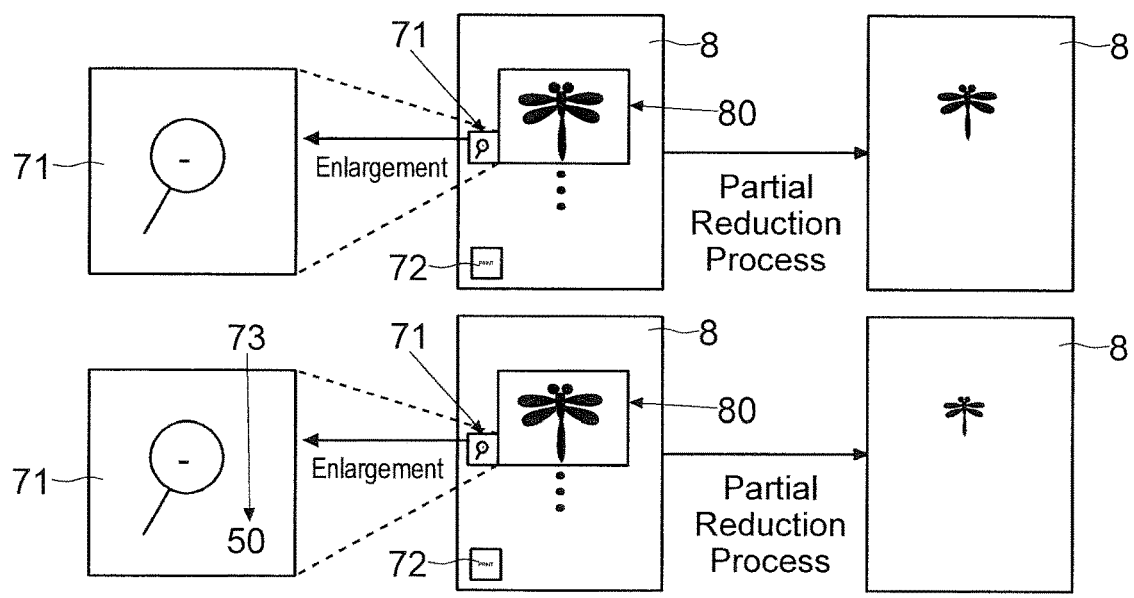
FIG. 13 is a view showing yet another example of the first type image according to the embodiment.

Each of graphics at the left end in FIG. 13 is an enlarged representation of an image as the first type image 71 corresponding to an image process of partial reduction. The image process of partial reduction is a process of reducing an area in the acquired image data 8 designated by the designation frame 80. Furthermore, in the image process of partial reduction, the controller 1 may erase contents outside the area designated by the designation frame 80 (may replace the contents with white pixels).

When wishing to perform the image process of partial reduction, a user encloses, with the designation frame 80, an area in an original document or image data desired to be reduced and retained. The user adds the image as the first type image 71 corresponding to partial reduction to the original document or image data so that the image is in contact with the designation frame 80. The image as the first type image 71 corresponding to partial reduction includes an image of a magnifier including a symbol "-."

Each of drawings in the middle in FIG. 13 shows one example of the acquired image data 8 to which the image as the first type image 71 corresponding to partial reduction and the designation frame 80 have been added. Each of drawings at the right end in FIG. 13 shows one example of image data that has been subjected to the image process of partial reduction (the acquired image data 8 that has been processed).

A user can make a setting so that the processing numerical value 73 is included in (added to) the image as the first type image 71 corresponding to partial reduction. The processing numerical value 73 used for partial reduction is a scaling factor. The controller 1 performs an OCR process with respect to contents within a region of the image as the first type image 71 corresponding to partial reduction. Then, it is determined whether or not the processing numerical value 73 (a scaling factor, %) is included therein.

When the image as the first type image 71 corresponding to partial reduction includes the processing numerical value 73, the controller 1 (the image processing circuit 12) performs an image process of reducing a size of image data within the designation frame 80 to a size obtained by multiplying the size of the image data by the processing numerical value 73. When "50%" is written as a scaling factor in the image as the first type image 71 corresponding to partial reduction as shown in the drawing on the lower left side in FIG. 13, the controller 1 generates image data to which data obtained by reducing, to 50%, a size of the area enclosed with the designation frame 80 has been pasted. The controller 1 pastes the data so that a center of the area enclosed with the designation frame 80 is aligned with a center of the data reduced. Based on the image data thus generated, the controller 1 generates job execution image data.

When the image as the first type image 71 corresponding to partial reduction does not include the processing numerical value 73, the controller 1 (the image processing circuit 12) performs an image process of decreasing a size of image data within the designation frame 80 by a default scaling factor for partial reduction. When no numerical value indicating a scaling factor is written in the image as the first type image 71 as shown in the drawing on the upper left side in FIG. 13, the controller 1 generates image data to which data obtained by decreasing a size of the area enclosed with the designation frame 80 by the default scaling factor for partial reduction has been pasted. The controller 1 pastes the data so that a center of the area enclosed with the designation frame 80 is aligned with a center of the data reduced. Based on the image data thus generated, the controller 1 generates job execution image data. The default scaling factor for a partial reduction process is predetermined. The operation panel 4 may accept a setting of the default scaling factor for partial reduction. In this case, the controller 1 performs the process by using a scaling factor thus set as the default scaling factor.

(9) Highlighting

Figure 14:
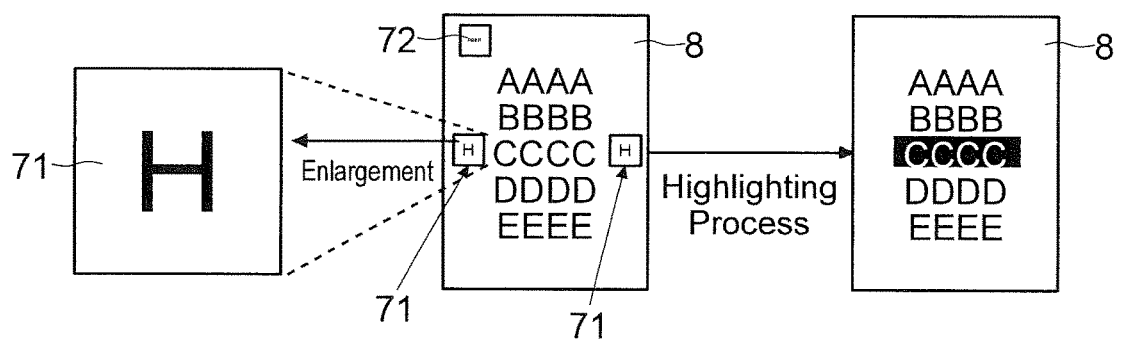
FIG. 14 is a view showing yet another example of the first type image according to the embodiment.

A graphic at the left end in FIG. 14 is an enlarged representation of an image as the first type image 71 corresponding to an image process of highlighting (character emphasis). The image process of highlighting is a process of changing a background color of a character(s) in a designated part so as to emphasize the character(s). When wishing to perform the image process of highlighting, a user adds the image as the first type image 71 corresponding to highlighting to an original document. The image as the first type image 71 corresponding to highlighting includes a character "H."

In performing the image process of highlighting, a user adds at least two images as the first type image 71 corresponding to highlighting to an original document or image data. The user adds the images as the first type image 71 corresponding to highlighting so that a beginning and an end of a line desired to be highlighted are sandwiched between the two images.

A drawing in the middle in FIG. 14 shows one example of the acquired image data 8 to which the images as the first type image 71 corresponding to highlighting have been added. A drawing at the right end in FIG. 14 shows one example of image data that has been subjected to the image process of highlighting (the acquired image data 8 that has been processed). The controller 1 recognizes an area in the acquired image data 8 sandwiched between the images as the first type image 71 corresponding to highlighting. For example, the controller 1 converts a pixel value of a high-density pixel (a pixel constituting a character) contained in the area recognized to a prescribed pixel value (for example, white). A threshold value for determining whether or not a pixel is a high-density pixel is predetermined. The controller 1 compares a pixel value of a pixel with the threshold value and determines whether or not the pixel is a high-density pixel. Furthermore, the controller 1 convers a pixel (a pixel in the background, a low-density pixel) other than the high-density pixel contained in the recognized area to a prescribed pixel value (for example, a pixel value of black or dark blue).

(Second Type Image 72)

Next, with reference to FIG. 15 to FIG. 19, a description is given of one example of the second type image 72 according to the embodiment. There are a plurality of types of jobs executable in the multi-functional peripheral 100. In order to select a type of a job to be executed, a user makes a setting so that the second type image 72 is included in an original document or image data (see FIG. 6 to FIG. 14). The following describes images as the second type image 72 and types of jobs corresponding thereto. The following describes, as an example, a case where the second type image 72 is a representation (mark) including a frame of a rectangular (square) shape. The frame may be omitted. Contents within the rectangular shape vary depending on a type of a job.

(1) Saving Job

FIG. 15 shows one example of an image as the second type image 72 corresponding to a saving job. When wishing to perform the saving job based on the acquired image data 8, a user adds the image as the second type image 72 corresponding to the saving job to an original document or image data. In an example shown in FIG. 15, the image as the second type image 72 corresponding to the saving job includes one downward arrow.

A saving destination symbol 74 can be included in (added to) the image as the second type image 72 corresponding to the saving job. The saving destination symbol 74 is a symbol for designating (setting) a saving destination. The saving destination symbol 74 is predetermined. The storage medium 2 stores saving destination definition data D3 (see FIG. 16). In the saving destination definition data D3, the saving destination symbol 74 and an address (path) of a saving location corresponding to the saving destination symbol 74 are defined. The controller 1 performs control so that job execution image data is stored in a folder at the address of the saving location corresponding to the saving destination symbol 74.

The operation panel 4 may accept a selection of a symbol as the saving destination symbol 74 and a setting of an address (path) of a saving location corresponding to the selected symbol as the saving destination symbol 74. In this case, the controller 1 performs control so that, as the saving destination definition data D3, a combination of the selected symbol as the saving destination symbol 74 and the address of the saving location thus inputted is stored in the storage medium 2. The selected symbol as the saving destination symbol 74 is associated with the inputted address of the saving location.

The saving destination symbol 74 may be formed of a single character. A drawing at the right end in FIG. 15 shows an example in which the saving destination symbol 74 is formed of a single alphabetical character "A." Furthermore, the saving destination symbol 74 may also be formed of a single-digit numeral. The saving destination symbol 74 may also be formed of a two-digit numeral. Furthermore, the saving destination symbol 74 may also be formed of a single symbol (for example, "#," "$").

The controller 1 determines whether or not the second type image 72 included in the acquired image data 8 includes the saving destination symbol 74. The controller 1 performs an OCR process with respect to contents within a region of the second type image 72. Then, the controller 1 determines whether or not the saving destination symbol 74 is included therein.

Upon determining that the second type image 72 includes the saving destination symbol 74, the controller 1 performs control so that job execution image data is saved at a saving location at an address corresponding to the saving destination symbol 74. As shown in a drawing on the left side in FIG. 15, the saving destination symbol 74 may not be added. Upon determining that the second type image 72 does not include the saving destination symbol 74, the controller 1 performs control so that job execution image data is saved at a predetermined default saving location. The operation panel 4 may accept a setting of the default saving location. In this case, the controller 1 performs control so that, as an address of the default saving location, a saving location (path) thus set (inputted) is stored in the storage medium 2.

(2) Transmission Job

FIG. 17 shows one example of an image as the second type image 72 corresponding to a transmission job. When wishing to perform the transmission job based on the acquired image data 8, a user adds the image as the second type image 72 corresponding to the transmission job to an original document or image data. In an example shown in FIG. 17, the image as the second type image 72 corresponding to the transmission job includes a pattern shaped like a letter.

A transmission destination symbol 75 may be included in (added to) the image as the second type image 72 corresponding to the transmission job. The transmission destination symbol 75 is a symbol for designating (setting) a transmission destination. The transmission destination symbol 75 is predetermined. The storage medium 2 stores transmission destination definition data D4 (see FIG. 18). In the definition data D4, the transmission destination symbol 75 and a transmission destination address corresponding to the transmission destination symbol 75 are defined. As such a transmission destination address, an email address, a folder of the communicable computer 200, or a facsimile number can be defined. The controller 1 controls the communication interface 6 to transmit job execution image data toward the transmission destination address corresponding to the transmission destination symbol 75.

The operation panel 4 may accept a selection of a symbol as the transmission destination symbol 75 and a setting of a transmission destination address (path) corresponding to the selected symbol as the transmission destination symbol 75. In this case, the controller 1 performs control so that, as the transmission destination definition data D4, a combination of the selected symbol as the transmission destination symbol 75 and the transmission destination address thus inputted is stored in the storage medium 2. The selected symbol as the transmission destination symbol 75 is associated with the inputted transmission destination address. The transmission destination symbol 75 may be formed of a single character. A drawing on the right side in FIG. 17 shows an example in which the transmission destination symbol 75 is formed of a single alphabetical character "D." Furthermore, the transmission destination symbol 75 may also be formed of a single-digit numeral. The transmission destination symbol 75 may also be a two-digit numeral. Furthermore, the transmission symbol 75 may also be formed of a single symbol (for example, "#," "$").

The controller 1 determines whether or not the second type image 72 included in the acquired image data 8 includes the transmission destination symbol 75. The controller 1 performs an OCR process with respect to contents within a region of the second type image 72. Then, it is determined whether or not the transmission destination symbol 75 is included therein.

Upon determining that the second type image 72 includes the transmission destination symbol 75, the controller 1 performs control so that job execution image data is transmitted to a transmission destination address corresponding to the transmission destination symbol 75. Upon determining that the second type image 72 does not include the transmission destination symbol 75 as shown in a drawing on the left side in FIG. 17, the controller 1 controls the communication interface 6 to transmit job execution image data toward a predetermined default transmission destination. For example, a shared data storage folder can be set as the default transmission destination. The operation panel 4 may accept a setting of the default transmission destination. In this case, the controller 1 performs control so that, as an address of the default transmission destination, a transmission destination address (path) thus set (inputted) is stored in the storage medium 2.

(3) Print Job

FIG. 19 shows one example of an image as the second type image 72 corresponding to a print job. When wishing to perform the print job based on the acquired image data 8, a user adds the image as the second type image 72 corresponding to the print job to an original document or image data. In an example shown in FIG. 19, the image as the second type image 72 corresponding to the print job includes a character string "PRINT."

A copy number value 76 can be included in (added to) the image as the second type image 72 corresponding to the print job. The copy number value 76 is a numeral for designating (setting) the number of copies to be printed. A user adds a numeral indicating a desired number of copies to be printed into the image as the second type image 72. A drawing on the right side in FIG. 19 shows an example in which a numeral "4" is written as the copy number value 76.

The controller 1 determines whether or not the second type image 72 included in the acquired image data 8 includes the copy number value 76. The controller 1 performs an OCR process with respect to contents within a region of the second type image 72. When a numeral is included in the image as the second type image 72 corresponding to the print job, the controller 1 determines that the copy number value 76 is included therein. When no numeral is included therein, the controller 1 determines that the copy number value 76 is not included therein.

Upon determining that the image as the second type image 72 includes the copy number value 76, the controller 1 controls the printing unit 5 to print a number of copies indicated by the copy number value 76. Upon determining that the image as the second type image 72 does not include the copy number value 76 or when "1" is written therein as the copy number value 76, the controller 1 controls the printing unit 5 to print one copy.

MODIFICATION EXAMPLE

Next, with reference to FIG. 20, a description is given of one example of a multi-functional peripheral 100 according to a modification example. FIG. 20 is a view for explaining the multi-functional peripheral 100 according to the modification example. The foregoing has described the examples in which the mark using mode is selected on the operation panel 4 and a process based on the first type image 71 and a process based on the second type image 72 are performed. The modification example describes an exemplary case in which a dedicated sheet or dedicated image data is used to enable the use of the mark using mode to be started. Although the multi-functional peripheral 100 according to the modification example may be configured similarly to the multi-functional peripheral 100 according to the foregoing embodiment, the operation panel 4 may not be included therein.

From the viewpoint of reducing a manufacturing cost or a selling price, in some cases, the operation panel 4 may not be provided in an image processing apparatus. That is, some image processing apparatuses do not include the operation panel 4. In such an image processing apparatus, a selection as to whether or not to use the mark using mode cannot be made on the operation panel 4.

As a solution to this, in the image processing apparatus according to the modification example, when having read an original document containing a mode start image 91, the controller 1 performs the process in the mark using mode. The mode start image 91 is an image for stopping the normal mode and starting the use of the mark using mode. The mode start image 91 is predetermined. The storage medium 2 stores image data of the mode start image 91.

Furthermore, in the image processing apparatus according to the modification example, when having read an original document containing a mode stop image 92, the controller 1 does not perform the process in the mark using mode. The controller 1 executes a job in the normal mode. The mode stop image 92 is an image for stopping the mark using mode and starting the use of the normal mode. The mode stop image 92 is predetermined. The storage medium 2 stores image data of the mode stop image 92.

Even in a configuration without the operation panel 4, typically, a start button (the hard keys 43) for starting reading of an original document is provided. Upon the start button being operated, the controller 1 starts reading of an original document. Then, the controller 1 generates the acquired image data 8. The controller 1 analyzes the acquired image data 8.

The controller 1 determines whether or not the acquired image data 8 includes the mode start image 91. Furthermore, the controller 1 determines whether or not the mode stop image 92 is included therein. The controller 1 may perform the pattern matching process so as to determine whether or not the acquired image data 8 includes the mode start image 91 or the mode stop image 92.

For example, the controller 1 checks whether or not the acquired image data 8 includes a part whose matching rate with (similarity rate to) the image data of the mode start image 91 is equal to or more than a predetermined threshold value. When the part whose matching rate (similarity rate) is equal to or more than the threshold value is included, the controller 1 determines that the acquired image data 8 includes the mode start image 91. In this case, the controller 1 starts the mark using mode. During the mark using mode, the controller 1 determines whether or not the first type image 71 and the second type image 72 are included.

Furthermore, the controller 1 checks whether or not the acquired image data 8 includes a part whose matching rate with (similarity rate to) the image data of the mode stop image 92 is equal to or more than a predetermined threshold value. When the part whose matching rate (similarity rate) is equal to or more than the threshold value is included, the controller 1 determines that the acquired image data 8 includes the mode stop image 92. In this case, the controller 1 starts the normal mode. During the normal mode, the controller 1 does not determine whether or not the first type image 71 and the second type image 72 are included.

A drawing on the left side in FIG. 20 shows one example of an original document including the mode start image 91. A drawing on the right side in FIG. 20 shows one example of an original document including the mode stop image 92. Each of these images includes a triangle and a quadrangle that are superimposed on each other. The triangle signifies progress (use). The quadrangle signifies a stop. Hence, in the mode start image 91, the triangle is arranged on an upper layer side with respect to the quadrangle. In the mode stop image 92, the triangle is arranged on a lower layer side with respect to the quadrangle.

The image processing apparatus (the multi-functional peripheral 100) according to the embodiment or the modification example includes the acquisition unit (the image reading unit 3, the communication interface 6), the job execution unit (the storage medium 2, the communication interface 6, the printing unit 5), the storage medium 2, and the controller 1. The acquisition unit acquires image data. The storage medium 2 stores the first definition data D1 and the second definition data D2. Based on the first definition data D1 and the second definition data D2, the controller 1 determines whether or not the acquired image data 8 acquired by the acquisition unit includes the first type image 71 and the second type image 72. The first definition data D1 is data defining data of the first type image 71 and an image process corresponding to the first type image 71. The second definition data D2 is data defining data of the second type image 72 and a type of a job corresponding to the second type image 72. In a case where the first type image 71 and the second type image 72 are included in the acquired image data 8, the controller 1 performs the image process corresponding to the first type image 71 with respect to the acquired image data 8 and generates job execution image data. The controller 1 controls the job execution unit to perform, based on the job execution image data thus generated, the job corresponding to the second type image 72.

A user could add, to an original document or image data, an image as the first type image 71 (a mark) corresponding to an image process desired to be used. Simply by adding the first type image 71, it is possible to control the image processing apparatus to perform a desired image process. Furthermore, a user could add, to an original document, an image as the second type image 72 (a mark) corresponding to a type of a job desired to be executed. Simply by adding the second type image 72, it is possible to control the image processing apparatus to perform a desired job. It is possible to command an operation to be performed without the need to operate a setting device such as the operation panel 4 or a portable communication device. Furthermore, the first type image 71 and the second type image 72 may be added by handwriting to an original document. The first type image 71 and the second type image 72, therefore, can be easily added.

The storage medium 2 serves as the job execution unit. The storage medium 2 stores the saving destination symbol 74 for designating a saving destination and an address of a saving location corresponding to the saving destination symbol 74. In a case where the acquired image data 8 includes an image as the second type image 72 corresponding to the saving job, when the image as the second type image 72 includes the saving destination symbol 74, the controller 1 performs control so that job execution image data is saved at the saving location corresponding to the saving destination symbol 74. When the image as the second type image 72 does not include the saving destination symbol 74, the controller 1 performs control so that job execution image data is saved at a predetermined default saving location. Simply by adding a mark, image data that has been subjected to image processing can be stored (saved). Furthermore, simply by adding the saving destination symbol 74, image data can be stored at a desired saving destination. Furthermore, image data can also be stored at a default storage destination. Image data can be stored at a desired saving location without the need to finely set an address of the saving location.

The image processing apparatus includes the communication interface 6 as the job execution unit. The storage medium 2 stores the transmission destination symbol 75 for designating a transmission destination and a transmission destination address corresponding to the transmission destination symbol 75. In a case where the acquired image data 8 includes an image as the second type image 72 corresponding to the transmission job, when the image as the second type image 72 includes the transmission destination symbol 75, the controller 1 controls the communication interface 6 to transmit job execution image data by using the transmission destination address corresponding to the transmission destination symbol 75 as a destination. When the image as the second type image 72 does not include the transmission destination symbol 75, the controller 1 controls the communication interface 6 to transmit job execution image data toward a predetermined default transmission destination. Simply by adding a mark, image data that has been subjected to image processing can be transmitted. Simply by adding a symbol to the mark (the second type image 72), image data can be transmitted to a desired transmission destination. Furthermore, image data can also be transmitted to the default transmission destination. Image data can be transmitted to a desired transmission destination without the need to finely set an address of a transmission destination.

The image processing apparatus includes the printing unit 5 as the job execution unit. In a case where the acquired image data 8 includes an image as the second type image 72 corresponding to the print job, when the image as the second type image 72 includes the copy number value 76 indicating the number of copies to be printed, the controller 1 controls the printing unit 5 to print, based on job execution image data, a number of copies indicated by the copy number value 76. When the image as the second type image 72 does not include the copy number value 76, the controller 1 controls the printing unit 5 to print one copy based on job execution image data. Simply by adding a numeral indicating the number of copies to a mark (the second type image 72), printing based on image data that has been subjected to image processing can be performed. It is possible to obtain printed matter processed as desired.

When the first type image 71 included in the acquired image data 8 includes the processing numerical value 73, with respect to the acquired image data 8, the controller 1 performs an image process to which the processing numerical value 73 is applied. When the first type image 71 included in the acquired image data 8 does not include the processing numerical value 73, the controller 1 performs an image process of performing a predetermined default process. Simply by adding a numeral to the first type image 71, it is possible to control the image processing apparatus to perform an image process corresponding to the numeral thus written.

The image processing apparatus includes the operation panel 4 that accepts a selection as to whether or not to use the mark using mode in which a job is performed based on the first type image 71 and the second type image 72. When a selection has been made to use the mark using mode, the controller 1 performs an image process corresponding to the first type image 71 with respect to the acquired image data 8 and generates job execution image data. The controller 1 controls the job execution unit to perform, based on the job execution image data thus generated, a job corresponding to the second type image 71. When a selection has been made not to use the mark using mode, the controller 1 does not determine whether or not the acquired image data 8 includes the first type image 71 and the second type image 72. Only when the mark using mode is enabled, an image process corresponding to the first type image 71 can be performed. Furthermore, only when the mark using mode is enabled, a job corresponding to the second type image 72 can be performed. It is possible to make a selection as to whether or not to execute a job through analysis of the first type image 71 and the second type image 72.

The controller 1 determines whether or not the acquired image data 8 includes the mode start image 91. When the mode start image 91 is included, a process in the mark using mode is started. In the mark using mode, the controller 1 performs an image process corresponding to the first type image 71 and generates job execution image data. The controller 1 controls the job execution unit to perform, based on the job execution image data thus generated, a job corresponding to the second type image 72. Simply by causing an original document including the mode start image 91 to be read, a user can start the mark using mode. An operation of reading an original document including the mode start image 91 can be used as a trigger for starting the mark using mode. Even in an image processing apparatus without the operation panel 4, the mark using mode can be easily used.

The image processing apparatus include the display panel 41. In a case where the acquired image data 8 does not include either or both of the first type image 71 and the second type image 72, the controller 1 controls the display panel 41 to display a warning prompting re-acquisition of the acquired image data 8. When it cannot be determined what type of image process should be performed, it is possible to prompt re-acquisition (re-reading) of image data. Furthermore, also when it cannot be determined what type of job should be performed, it is possible to prompt re-acquisition (re-reading) of image data.

When the acquired image data 8 includes the designation frame 80, the controller 1 performs an image process corresponding to the first type image 71 with respect to an area designated by the designation frame 80. An area to be subjected to image processing can be designated by enclosing the area with a frame.

While the foregoing has described the embodiment of the present disclosure, the scope of the present disclosure is not limited thereto. The present disclosure can be implemented by adding various modifications thereto without departing from the spirit of the disclosure.

What is claimed is:

1. An image processing apparatus, comprising:
   an acquisition unit that includes an image reading unit including a light source, a lens, and an image sensor and acquires image data;
   a storage medium that stores first definition data and second definition data;
   a controller that includes a control circuit and an image processing circuit and, based on the first definition data and the second definition data, determines whether or not acquired image data acquired by the acquisition unit includes a first type image and a second type image; and
   an operation panel that accepts a selection as to whether or not to use a mark using mode in which a job is performed based on the first type image and the second type image,
   wherein
   the first definition data is data defining data of the first type image and an image process corresponding to the first type image,
   the second definition data is data defining data of the second type image and a type of a job corresponding to the second type image,
   when a selection has been made to use the mark using mode and the acquired image data includes the first type image and the second type image, the controller performs the image process corresponding to the first type image with respect to the acquired image data and generates job execution image data, and performs, based on the job execution image data thus generated, the job corresponding to the second type image, and
   when a selection has been made not to use the mark using mode, the controller does not determine whether or not the acquired image data includes the first type image and the second type image.

2. The image processing apparatus according to claim 1, wherein
   the storage medium stores a saving destination symbol for designating a saving destination and an address of a saving location corresponding to the saving destination symbol, and
   in a case where the acquired image data includes an image as the second type image corresponding to a saving job,
   when the image as the second type image includes the saving destination symbol, the controller performs control so that the job execution image data is saved at the saving location corresponding to the saving destination symbol, and
   when the image as the second type image does not include the saving destination symbol, the controller performs control so that the job execution image data is saved at a predetermined default saving location.

3. The image processing apparatus according to claim 1, further comprising:
   as the acquisition unit, a communication interface that performs communication so as to acquire image data and includes a communication circuit and a communication memory,
   wherein the storage medium stores a transmission destination symbol for designating a transmission destination and a transmission destination address corresponding to the transmission destination symbol, and
   in a case where the acquired image data includes an image as the second type image corresponding to a transmission job,
   when the image as the second type image includes the transmission destination symbol, the controller controls the communication interface to transmit the job execution image data by using the transmission destination address corresponding to the transmission destination symbol as a destination, and
   when the image as the second type image does not include the transmission destination symbol, the controller controls the communication interface to transmit the job execution image data toward a predetermined default transmission destination.

4. The image processing apparatus according to claim 1, further comprising:
   wherein in a case where the acquired image data includes an image as the second type image corresponding to a print job,
   when the image as the second type image includes a copy number value indicating a number of copies to be printed, the controller controls to print, based on the job execution image data, the number of copies indicated by the copy number value, and
   when the image as the second type image does not include the copy number value, the controller controls to print one copy based on the job execution image data.

5. The image processing apparatus according to claim 1, wherein
   when the first type image included in the acquired image data includes a processing numerical value, with respect to the acquired image data, the controller performs an image process to which the processing numerical value is applied, and when the first type image included in the acquired image data does not include the processing numerical value, the controller performs an image process of performing a predetermined default process.

6. The image processing apparatus according to claim 1, wherein when the acquired image data includes a designation frame, the controller performs an image process corresponding to the first type image with respect to an area designated by the designation frame.

7. An image processing apparatus, comprising:

an acquisition unit that includes an image reading unit including a light source, a lens, and an image sensor and acquires image data;

a storage medium that stores first definition data and second definition data; and a controller that includes a control circuit and an image processing circuit and, based on the first definition data and the second definition data, determines whether or not acquired image data acquired by the acquisition unit includes a first type image and a second type image, wherein the first definition data is data defining data of the first type image and an image process corresponding to the first type image, the second definition data is data defining data of the second type image and a type of a job corresponding to the second type image, in a case where the acquired image data includes the first type image and the second type image, the controller performs the image process corresponding to the first type image with respect to the acquired image data and generates job execution image data, based on the job execution image data thus generated, the controller performs the job corresponding to the second type image, the controller determines whether or not the acquired image data includes a mode start image, when the mode start image is included, the controller starts a process in a mark using mode, and in the mark using mode, the controller performs the image process corresponding to the first type image and generates the job execution image data, and performs, based on the job execution image data thus generated the job corresponding to the second type image.

8. An image processing apparatus, comprising:

an acquisition unit that includes an image reading unit including a light source, a lens, and an image sensor and acquires image data;

a storage medium that stores first definition data and second definition data;

a controller that includes a control circuit and an image processing circuit and, based on the first definition data and the second definition data, determines whether or not acquired image data acquired by the acquisition unit includes a first type image and a second type image; and a display panel, wherein the first definition data is data defining data of the first type image and an image process corresponding to the first type image, the second definition data is data defining data of the second type image and a type of a job corresponding to the second type image, in a case where the acquired image data includes the first type image and the second type image, the controller performs the image process corresponding to the first type image with respect to the acquired image data and generates job execution image data, based on the job execution image data thus generated, the controller performs the job corresponding to the second type image, and in a case where the acquired image data does not include either or both of the first type image and the second type image, the controller controls the display panel to display a warning prompting re-acquisition of the acquired image data.

\* \* \* \* \*